United States Patent
Kung et al.

(10) Patent No.: US 7,382,225 B2
(45) Date of Patent: Jun. 3, 2008

(54) RADIO FREQUENCY IDENTIFICATION SECURITY SYSTEM AND METHOD

(75) Inventors: Shao-Tsu Kung, Taipei (TW); Yi-Hung Shen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 259 days.

(21) Appl. No.: 11/244,144

(22) Filed: Oct. 6, 2005

(65) Prior Publication Data

US 2006/0208853 A1 Sep. 21, 2006

(30) Foreign Application Priority Data

Mar. 7, 2005 (TW) .............................. 94106855 A

(51) Int. Cl.
*G05B 19/00* (2006.01)
(52) U.S. Cl. ..................... 340/5.61; 340/5.2; 340/5.81; 340/10.42; 726/2
(58) Field of Classification Search ............... 340/5.61, 340/5.6, 5.85, 5.81, 5.8, 5.2, 5.1, 10.1, 10.4, 340/10.42; 726/2, 9; 380/270
See application file for complete search history.

(56) References Cited

U.S. PATENT DOCUMENTS 5,629,981 A * 5/1997 Nerlikar .................. 340/10.42
5,960,085 A * 9/1999 de la Huerga ............. 340/5.61
2005/0151623 A1* 7/2005 von Hoffmann ........... 340/5.61
2006/0158341 A1* 7/2006 Chipchase et al. ......... 340/10.1

FOREIGN PATENT DOCUMENTS

WO WO2004003829 A1 * 1/2004

* cited by examiner

*Primary Examiner*—Thomas Mullen

(57) ABSTRACT

A radio frequency identification (RFID) security system includes an RFID tag and a portable electronic device. The RFID tag has a user ID code. The portable electronic device has a reader, an identification memory and an identification controller. The reader is used to communicate with the RFID tag and to receive the user ID code. The identification memory is used to store a user password. The identification controller is electrically connected to the reader and the identification memory and is used to compare the user ID code and the user password. When the user ID code is the same as the user password, the identification controller is arranged to transmit an enable signal to grant the access of the portable electronic device.

12 Claims, 7 Drawing Sheets

RADIO FREQUENCY IDENTIFICATION SECURITY SYSTEM AND METHOD

RELATED APPLICATIONS

The present application is based on, and claims priority from, Taiwan Application Serial Number 94106855, filed Mar. 7, 2005, the disclosure of which is hereby incorporated by reference herein in its entirety.

BACKGROUND

1. Field of Invention

The present invention relates to a radio frequency identification (RFID) system. More particularly, the present invention relates to an apparatus and method for controlling the access of a portable electronic device by an RFID tag.

2. Description of Related Art

All kinds of portable electronic devices, such as notebook computers, personal digital assistants (PDAs) and mobile phones, change with each passing day, developed to be lighter, thinner and smaller, and even having communication functionality or network accessibility. Moreover, the portable electronic devices are gradually expanding to have multiple complex functions and personal information management, such that the data security thereof seems more and more important.

The traditional security system used in portable electronic devices generally controls the access of the portable electronic device by a password, such as a power-on password or a user password, preventing hacking and data corruption. However, this password security system is vulnerable to being broken into by a hacker and is inconvenient for a user, who frequently needs to manually input a password. A relatively new security system uses fingerprint identification to control the user access. However, the identification plate used in a fingerprint security system may become worn from long-term use to affect its identification accuracy. Thus the identification performance of the fingerprint security system is also not an ideal choice for security.

SUMMARY

It is therefore an aspect of the present invention to provide a radio frequency identification (RFID) security system, which controls the access of the portable electronic device by a non-contact radio frequency identification manner, to replace the conventional contact identification manner which is easily broken by a hacker, needs complicated manual input, and has poor identification accuracy.

According to one preferred embodiment of the invention, the RFID security system comprises an RFID tag and a portable electronic device. The RFID tag comprises a tag antenna, a tag memory and a tag controller. The tag antenna receives a reader ID code, and the tag memory stores a reader password. The tag controller is electrically connected to the tag antenna and the tag memory and determines whether the reader ID code is the same as the reader password. When the reader ID code is the same as the reader password, the tag controller transmits a user ID code through the tag antenna.

The portable electronic device comprises a reader, an identification memory and an identification controller. The reader communicates with the RFID tag for receiving the user ID code and transmitting the reader ID code. The identification memory stores a user password. The identification controller is electrically connected to the reader and the identification memory and determines whether the user ID code is the same as the user password. When the user ID code is the same as the user password, the identification controller transmits an enable signal to grant an access of the portable electronic device.

It is another aspect of the present invention to provide an RFID security method, which can control and manage the access for several different users to the same portable electronic device and prevent the user ID code from being read or copied without any limits.

According to another preferred embodiment of the present invention, the RFID security method receives a reader ID code transmitted from a reader by an RFID tag and determines whether the reader ID code is the same as a reader password stored in the RFID tag. When the reader ID code is the same as the reader password, a user ID code is transmitted. Next, the user ID code is received by a reader configured on the portable electronic device, which determines whether the user ID code is the same as a user password. When the user ID code is the same as the user password, the access of the portable electronic device is granted; when the user ID code is different from the user password, the access of the portable electronic device is denied.

It is to be understood that both the foregoing general description and the following detailed description are examples and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
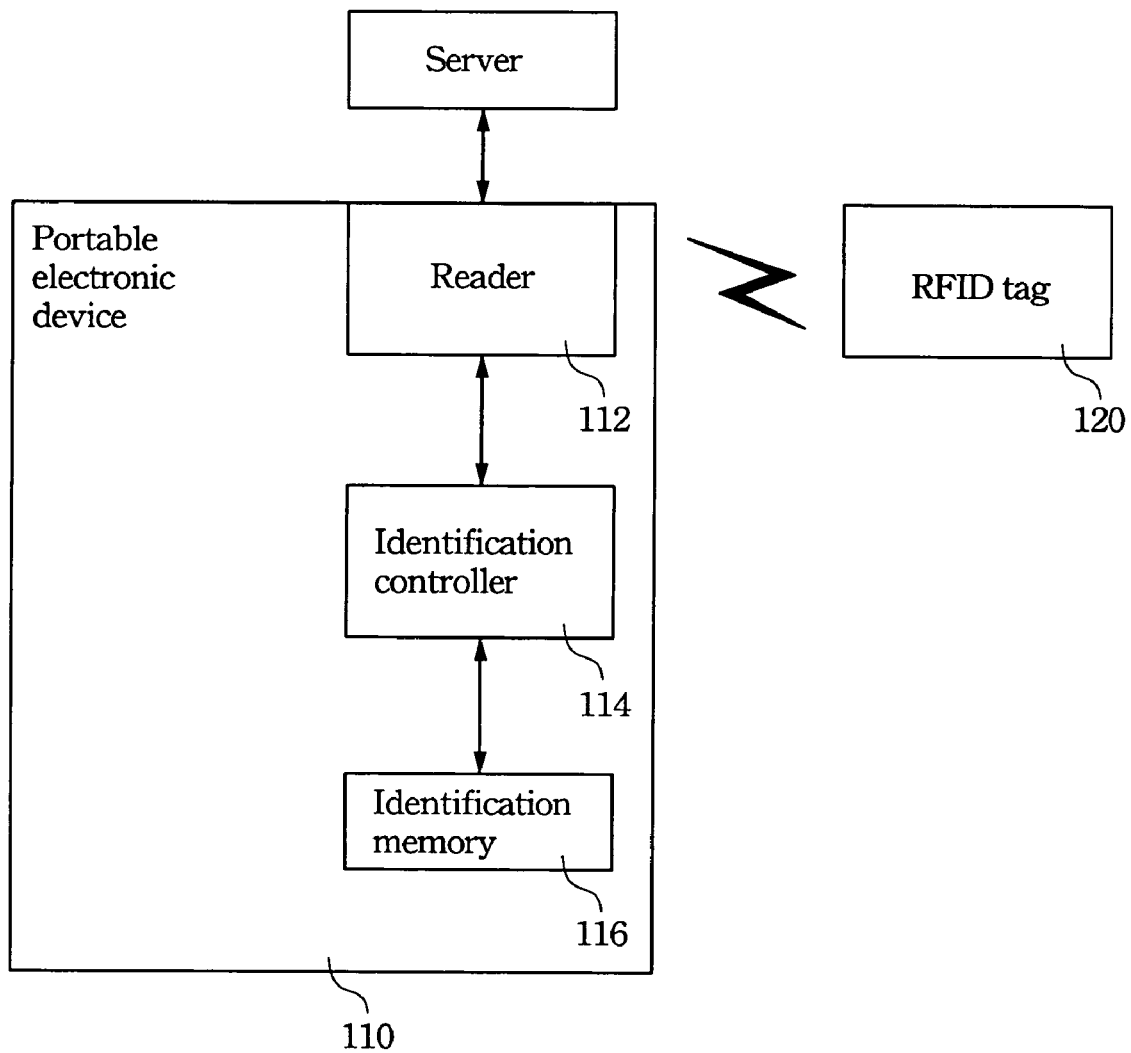
FIG. 1 is a schematic view of a first preferred embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

Radio frequency identification (RFID) is a non-contact automatic identification technique, which automatically identifies targets and obtains relative information by radio frequency signals, so as to have a fast and convenient process, omit manual operations during identifying, and be able to identify plural tags, even for dynamic targets, simultaneously. RFID is easily controlled, simple and practical, and especially applicable to automatic control techniques because it can be operated not only in read-only mode but also in read/write mode.

A complete RFID system comprises two parts, a reader and a transponder. The transponder is generally called an RFID tag. The operational principle of the RFID system is to transmit radio frequency energy of a certain frequency to the transponder for driving it to transmit its tag ID code, or alternatively, to transmit the tag ID code by the transponder itself. The reader receives the tag ID code and transmits it to a central system for carrying out relative data processing.

The present invention configures the reader in the portable electronic device and controls the access of the portable electronic device by the received user ID code of the RFID tag, so as to prevent easy cracking, complicated manual input, and poor identification accuracy of the conventional contact identification manner.

FIG. 1 is a schematic view of a first preferred embodiment of the present invention. As illustrated in FIG. 1, an RFID security system 100 comprises an RFID tag 120 and a portable electronic device 110. The RFID tag 120 has a user ID code. The portable electronic device 110 comprises a reader 112, an identification controller 114 and an identification memory 116. The reader 112 communicates with the RFID tag 120 for receiving the user ID code. The identification memory 116 stores a user password. The identification controller 114 is electrically connected to the reader 112 and the identification memory 116 and determines whether the user ID code is the same as the user password. When the user ID code is the same as the user password, the identification controller 114 transmits an enable signal to grant an access of the portable electronic device 110.

The portable electronic device 110 of the first preferred embodiment for example can be a notebook computer, a PDA, a mobile phone, a digital camera or other electronic device that can be taken along with the user. The identification controller 114 can be integrated into an embedded controller (EC) or a Southbridge chip (SB) besides standing alone because the portable electronic device 110 generally contains the embedded controller or the Southbridge chip.

Moreover, the embedded controller or the Southbridge chip is used to control the system settings of the portable electronic device 110, such as the battery setting, backlight setting, power-saving setting or direct playing function. Therefore, when the portable electronic device 110 is turned off, the foregoing enable signal can be a power-on password for turning on the portable electronic device 110. Similarly, when the portable electronic device 110 is suspended or idled to be operated in the sleep state, the foregoing enable signal can be a recovery signal or password such that the portable electronic device 110 returns from the suspend mode to the operating mode.

The identification memory 116, for example, can be an accessible BEPROM or other suitable memory. The capacity of identification memory 116 generally is enough to store several user ID codes for different users. Therefore, the RFJD security system 110 can control and manage the access for several different users to the same portable electronic device by the identification memory 116. Furthermore, when the embedded controller or the Southbridge chip is associated within the portable electronic device 110, the persons skilled in the art can realize that the enable signal of the first preferred embodiment can further include system setting instructions, which reset the system settings of the portable electronic device 110 to an optimal condition for a certain user while the access of the portable electronic device 110 is granted to the certain user.

Figure 2:
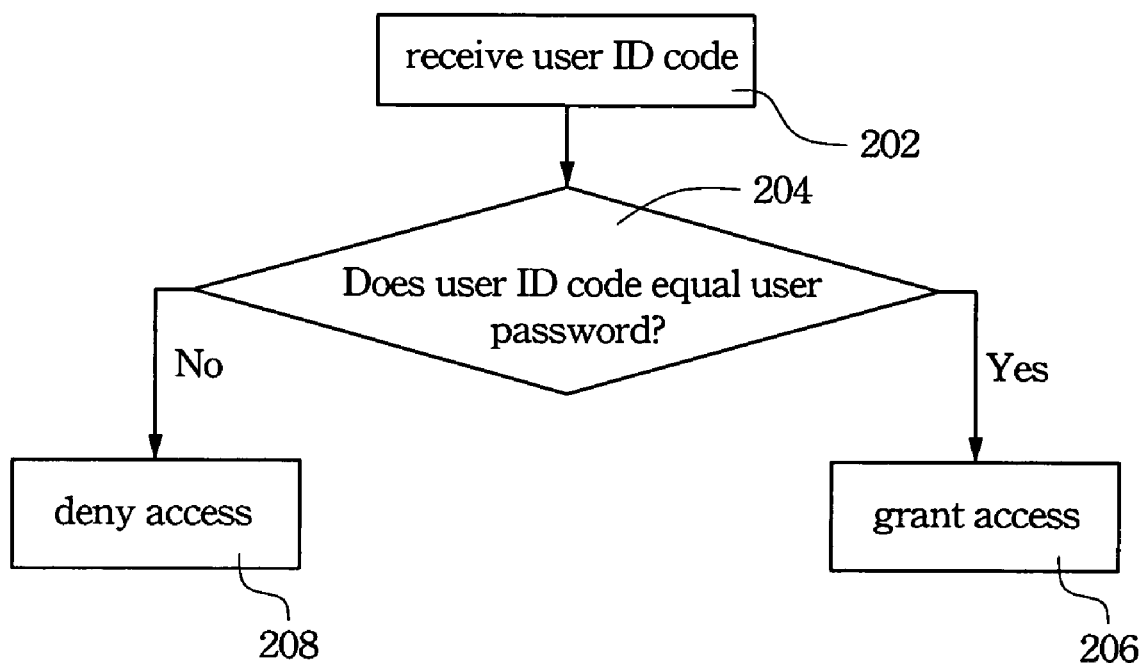
FIG. 2 is a flow chart of the first preferred embodiment of the present invention.

FIG. 2 is a flow chart of the first preferred embodiment of the present invention, illustrating the RFID security method of the present invention. For clarity, the following description is made with references to FIG. 1 and FIG. 2. First, the user ID code of the RFID tag 120 is received by the reader 112 configured on the portable electronic device 110 (step 202). Then, whether the user ID code is the same as a user password or not is determined (step 204). When the user ID code is the same as the user password, the access of the portable electronic device 110 is granted (step 206); when the user ID code is different from the user password, the access of the portable electronic device 110 is denied (step 208).

In addition, according to the first preferred embodiment of the present invention, the reader 112 can further periodically or randomly receive the user ID code. For example, the reader 112 can periodically or randomly transmit sense signals such that all RFID tags 120 positioned within the available range of the reader 112 can respond with their own user ID codes. Alternatively, if the RFID tag 120 is an active RFID tag, the reader 112 can periodically or randomly receive the user ID code transmitted from the active RFID tag 120. When the reader 112 does not receive the user ID code (as the user taking the RFID tag 120 along with him leaves the portable electronic device 110) or when the user ID code is different from the user password, the identification controller 114 transmits a disable signal to deny the access of the portable electronic device 110.

In order to prevent the user ID code from being read or copied without any limits, the present invention further adds a confirmation mechanism into the RFID tag, which firstly checks whether the reader is allowed to receive the user ID code, enhancing the security capability of the RFID security system of the present invention.

Figure 3A:
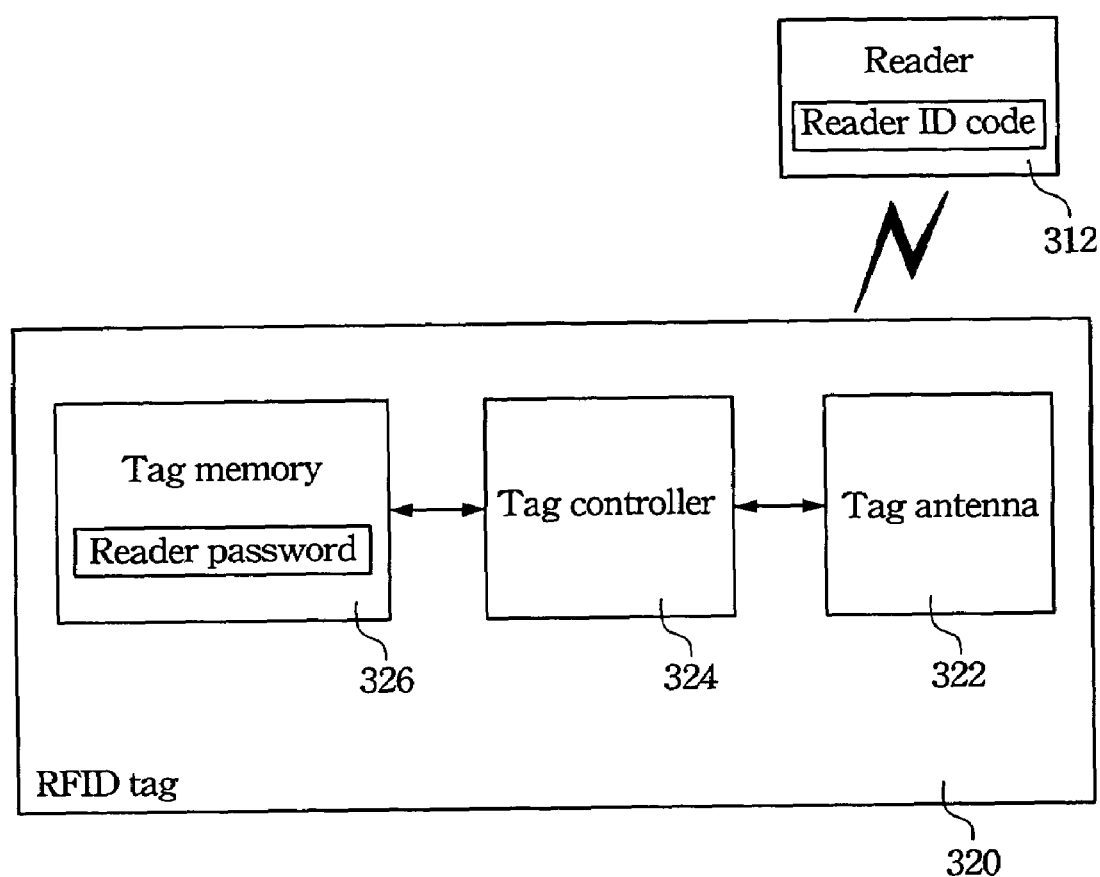
FIG. 3A is a schematic view of the RFID tag of the first preferred embodiment of the present invention.
Figure 3B:
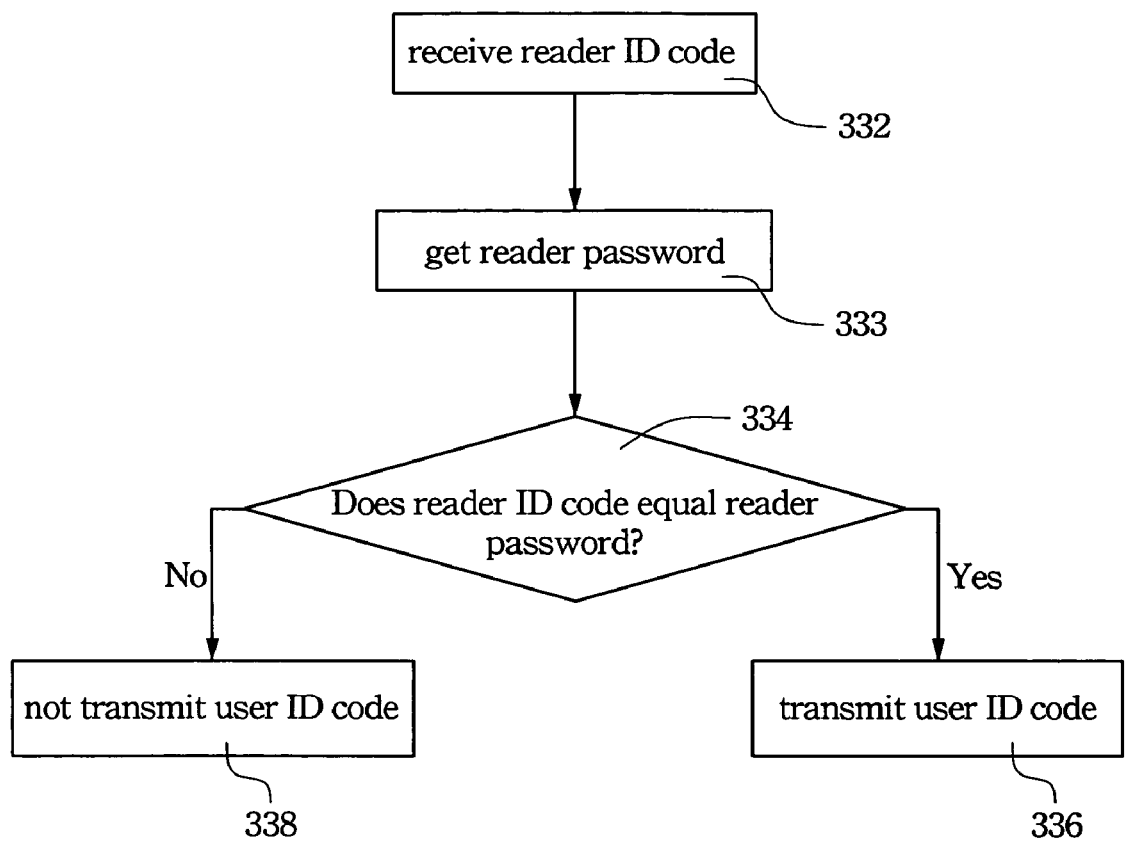
FIG. 3B is a flow chart of the first preferred embodiment.

FIG. 3A is a schematic view of the RFID tag of the first preferred embodiment of the present invention, and FIG. 3B is a flow chart of the first preferred embodiment. The following description is made with references to FIGS. 3A and 3B. In the preferred embodiment, the reader 312 transmits the reader ID code. The RFID tag 320 comprises a tag antenna 322, a tag memory 326 and a tag controller 324. The tag antenna 322 receives the reader ID code and transmits the user ID code. The tag memory 326 stores a reader password and the user ID code. The tag controller 324 is electrically connected to the tag antenna 322 and the tag memory 326 and determines whether the reader ID code is the same as the reader password.

As illustrated in FIG. 3B, an RFID tag 320 firstly receives a reader ID code transmitted from a reader 312 through a tag antenna 322 (step 332). A tag controller 324 reads a reader password stored in a tag memory 326 (step 333) and determines whether the reader ID code is the same as the reader password (step 334). When the reader ID code is the same as the reader password, the tag controller 324 transmits a user ID code through the tag antenna 322 (step 336); when the reader ID code is different from the reader password, the tag controller 324 does not transmit the user ID code (step 338). In other words, the RFID tag 320 transmits the user ID code until it confirms the reader 312 which is allowed to receive the user ID code, thus enhancing the security capability of the RFID security system.

Figure 4:
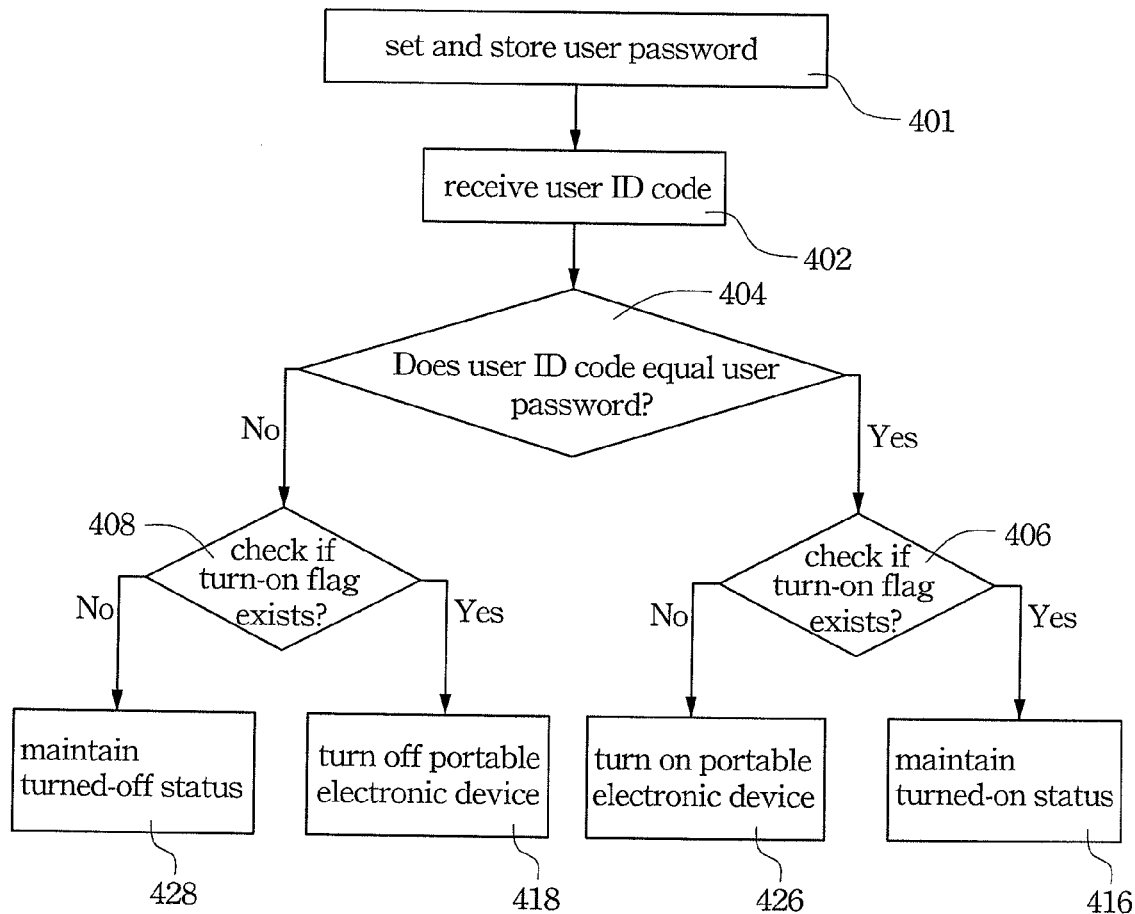
FIG. 4 is a flow chart of a second preferred embodiment of the present invention.

FIG. 4 is a flow chart of a second preferred embodiment of the present invention. Compared to the preferred embodiment in FIG. 2, this preferred embodiment additionally has a step for setting the user password and a mechanism of checking the turn-on flag. This preferred embodiment provides users the ability to set and store their passwords and provides further corresponding security actions with respect to the turned-on or turned-off status of the portable electronic device.

For clarity, the following description is made with references to FIG. 1 and FIG. 4. A user password is firstly set, such as assigning a user ID code of a certain RFID tag 120 to be the user password, and the user password is stored into the identification memory 116 by the identification controller 114 (step 401). Afterwards, when the RFID tag 120 approaches the portable electronic device 110 on which the reader 112 is configured, the reader 112 receives the user ID code transmitted from the RFID tag 120 (step 402) and determines whether the user ID code is the same as the user password (step 404).

No matter whether the user ID code is the same as the user password or not, the preferred embodiment performs a turn-on flag checking step, for checking whether the portable electronic device 110 is turned on or not at this moment (steps 406 and 408). When the turn-on flag exists, the portable electronic device 110 is turned on; when the turn-on flag is absent, the portable electronic device 110 is turned off.

When the user ID code is the same as the user password and the turn-on flag exists, the portable electronic device 110 maintains its turned-on status (step 416). When the user ID code is the same as the user password and the turn-on flag is absent, the portable electronic device 110 is turned on (step 426). Moreover, as stated above, the enable signal can selectively include a power-on password or system setting instructions, facilitating user manipulation.

On the other hand, when the user ID code is different from the user password and the turn-on flag exists, the portable electronic device 110 is turned off (step 418). When the user ID code is different from the user password and the turn-on flag is absent, the portable electronic device 110 maintains its turned-off status (step 428). This not only completes the security function of the portable electronic device 110 but also achieves power saving.

Figure 5:
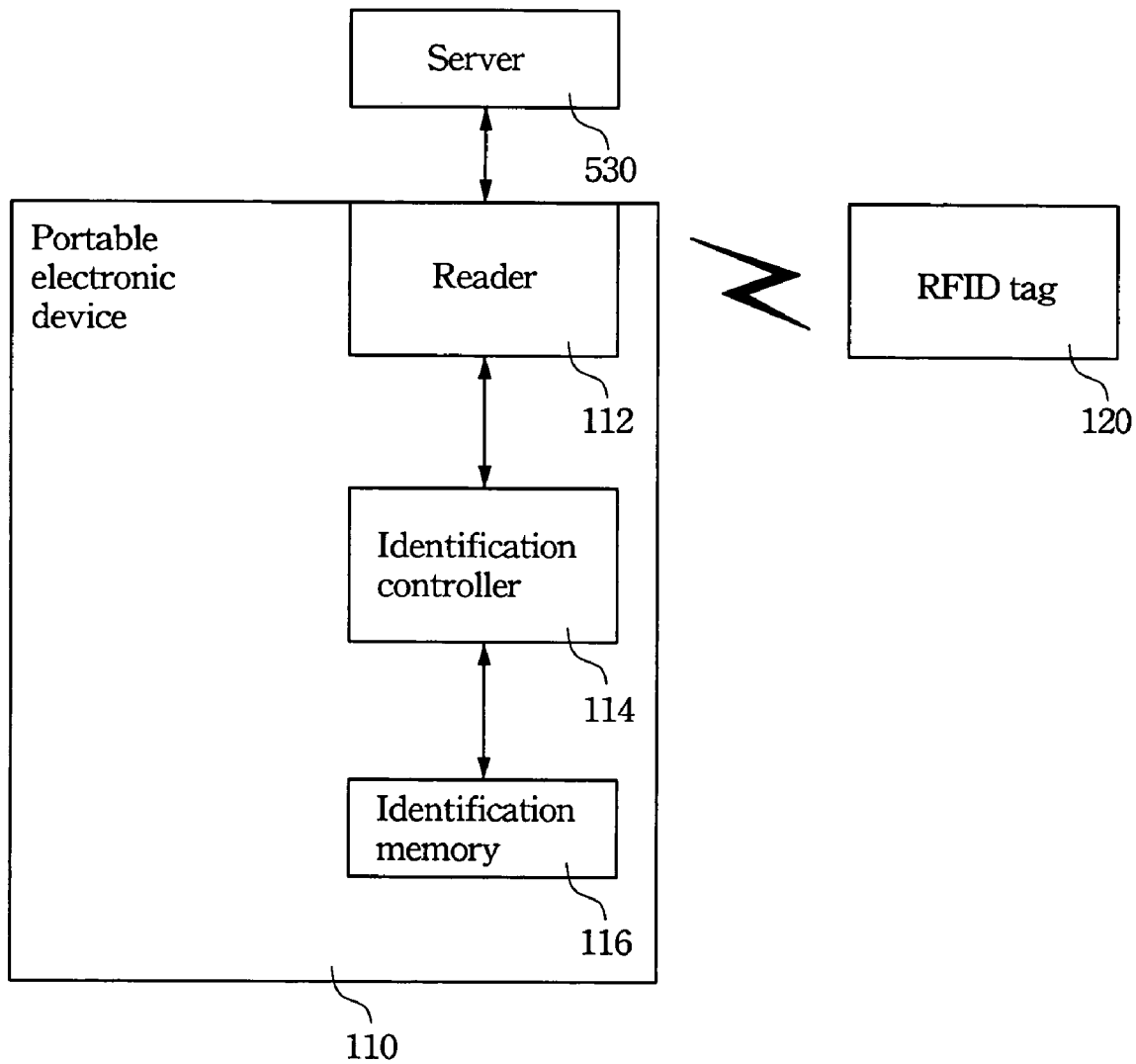
FIG. 5 is a schematic view of the second preferred embodiment of the present invention.
Figure 6:
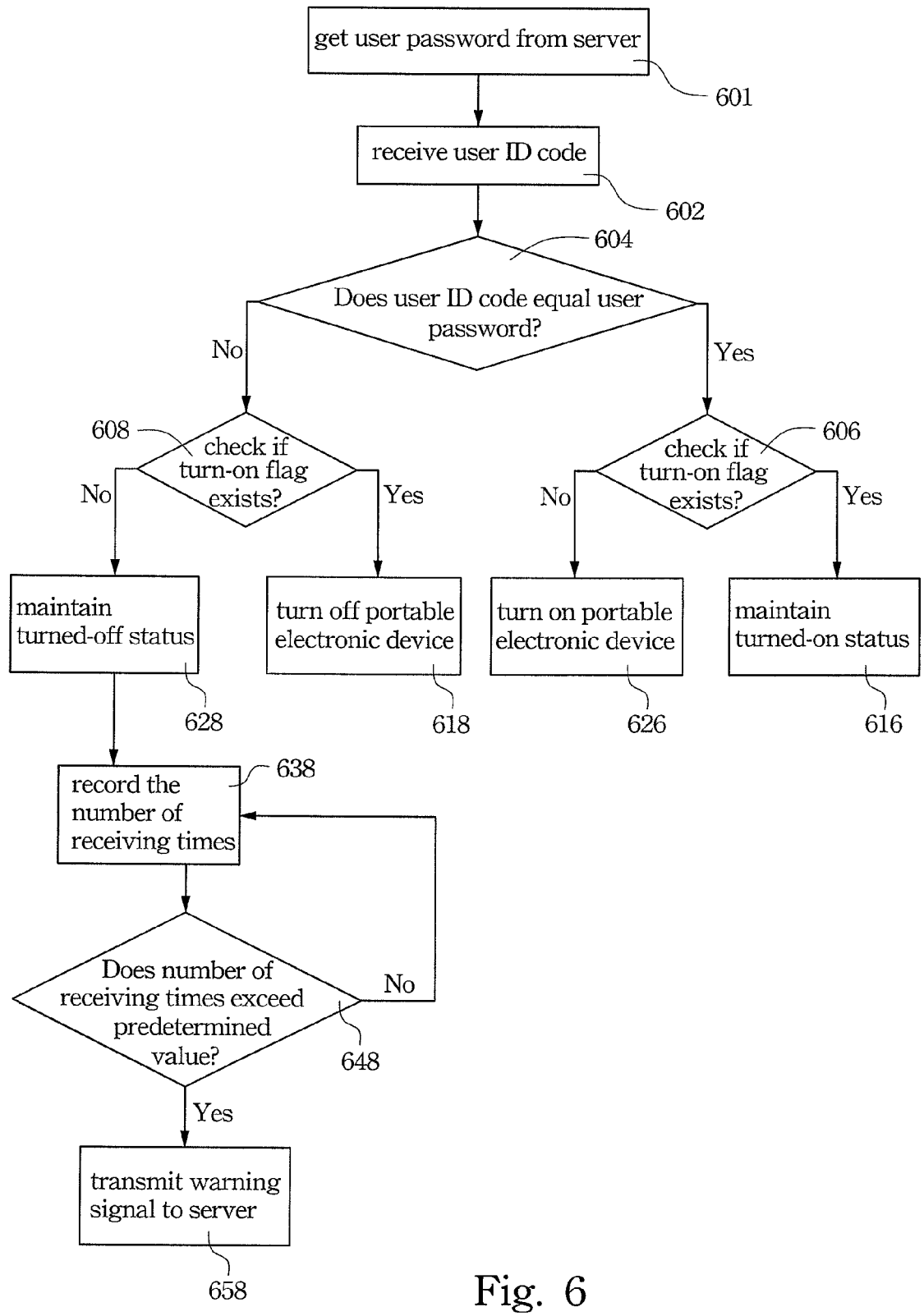
FIG. 6 is another flow chart of the second preferred embodiment.

FIG. 5 is a schematic view of the second preferred embodiment of the present invention, and FIG. 6 is another flow chart of the second preferred embodiment. Compared to the first preferred embodiment illustrated in FIG. 1, this second preferred embodiment provides the user password by a server. That is, the second preferred embodiment uses the server to control which users have access to the portable electronic device and is therefore especially suitable for managing the portable electronic devices within a region of high-security classification, such as a restricted area of a research and development department.

As illustrated in FIG. 5, an RFID security system 500 further comprises a server 530, and the RFID tag 120 and the portable electronic device 110 are the same as those of the first preferred embodiment illustrated in FIG. 1. The server 530 is used to provide the user password for storing or temporarily saving in the identification memory 116. The user password in this preferred embodiment is provided by the server 530, and therefore the system administrator of the RFID security system 500, such as an information security officer of the company, can real-time and instantly manage or change the access for different users to every portable electronic device 110 by the server 530.

More precisely, the user password is firstly obtained from the server, such as the user ID code of a certain RFID tag 120 and the user password is stored or temporarily saved into the identification memory 116 through the identification controller 114 (step 601). After that, when the RFID tag 120 approaches the portable electronic device 110 on which the reader 112 is configured, the reader 112 receives the user ID code transmitted by the RFID tag 120 (step 602) and determines whether the user ID code is the same as the user password (step 604).

Then, no matter whether the user ID code is the same as the user password or not, the second preferred embodiment performs a turn-on flag checking step, for checking whether the portable electronic device 110 is turned on or not at this moment (steps 606 and 608). When the turn-on flag exists, the portable electronic device 110 is turned on; when the turn-on flag is absent, the portable electronic device 110 is turned off.

When the user ID code is the same as the user password and the turn-on flag exists, the portable electronic device 110 maintains its turned-on status (step 616). When the user ID code is the same as the user password and the turn-on flag is absent, the portable electronic device 110 is turned on (step 626). Moreover, as stated above, the enable signal can selectively include a power-on password or system setting instructions, facilitating user manipulation.

On the other hand, when the user ID code is different from the user password and the turn-on flag exists, the portable electronic device 110 is turned off (step 618). When the user ID code is different from the user password and the turn-on flag is absent, the portable electronic device 110 maintains its turned-off status (step 628). This not only completes the security function of the portable electronic device 110 but also achieves power saving.

In addition, when the reader 112 receives an incorrect user ID code, for example, which is different from the user password, a number of receiving times of the different user ID code is recorded (step 638) and determined whether it exceeds a predetermined value (step 648). When the number of the receiving times exceeds the predetermined value, a warning signal is transmitted to the server for reminding the system administrator of the RFID security system 500 that a stranger is possibly close to the portable electronic device 110 (step 658), such as if a stranger burst into a restricted area without permission. The recording action can substantially improve the security capability of the RFID security system and enhance the control by the system administrator of the restricted area.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A radio frequency identification (RFID) security system, comprising:
   an RFID tag having a user ID code, wherein the RFID tag comprises:
   a tag antenna arranged to receive a reader ID code;
     a tag memory arranged to store a reader password; and
     a tag controller electrically connected to the tag antenna and the tag memory, and arranged to determine whether the reader ID code is the same as the reader password, wherein when the reader ID code is the same as the reader password, the tag controller is arranged to transmit the user ID code through the tag antenna; and
   a portable electronic device, comprising:
     a reader arranged to communicate with the RFID tag for receiving the user ID code and transmitting the reader ID code;

an identification memory arranged to store a user password; and an identification controller electrically connected to the reader and the identification memory, and arranged to determine whether the user ID code is the same as the user password, wherein when the user ID code is the same as the user password, the identification controller is arranged to output an enable signal, such that an access to the portable electronic device is granted.

2. The RFID security system as claimed in claim 1, further comprising a server arranged to provide the user password for storing into the identification memory.

3. The RED security system as claimed in claim 1, wherein the identification controller is an embedded controller or a Southbridge chip.

4. The RFID security system as claimed in claim 1, wherein the enable signal is a power-on password for granting the access of the portable electronic device.

5. The RFID security system as claimed in claim 1, wherein the reader is arranged to receive the user ID code, and when the user ID code is different from the user password, the identification controller is arranged to output a disable signal, such that the access to the portable electronic device is denied.

6. A radio frequency identification (RFID) security method, controlling an access of a portable electronic device by a RFID tag, the method comprising the steps of:
   a. the RFID tag receiving a reader ID code, and determining whether the reader ID code is the same as a reader password;
   b. transmitting a user ID code when the reader ID code is the same as the reader password; and
   c. receiving the user ID code by a reader configured on the portable electronic device, and determining whether the user ID code is the same as a user password by an identification controller configured on the portable electronic device;
     c1. granting the access of the portable electronic device when the user ID code is the same as the user password; and
     c2. denying the access of the portable electronic device when the user ID code is different from the user password.

7. The RFID security method as claimed in claim 6, wherein when the user ID code is the same as the user password in the step c1, the method further comprises the steps of:
   c11. the identification controller checking if a turn-on flag exists in the portable electronic device; and
   c12. turning on the portable electronic device when the turn-on flag is absent.

8. The RFID security method as claimed in claim 6, wherein when the user ID code is different from the user password in the step c2, the method further comprises the steps of:
   c21. the identification controller checking if a turn-on flag exists in the portable electronic device; and
   c22. turning off the portable electronic device when the turn-on flag exists.

9. The RFID security method as claimed in claim 6, wherein when the user ID code is different from the user password in the step c2, the method further comprises the steps of:
   c21. the identification controller recording a number of receiving times of the different user ID code; and
   c22. the identification controller transmitting a warning signal to a server when the number of the receiving times exceeds a predetermined value.

10. The RFID security method as claimed in claim 6, wherein when the reader does not receive the user ID code, the identification controller is arranged to deny the access of the portable electronic device.

11. The RFID security method as claimed in claim 6, wherein before the step a, the method further comprises:
   a1. setting the user password and storing the user password into an identification memory of the portable electronic device.

12. The RFID security method as claimed in claim 6, wherein before the step a, the method further comprises:
   a2. the portable electronic device getting the user password from a server for comparison to the user ID code.

* * * * *